J. C. TURNBULL.
Vehicle-Wheel.
No. 227,458.  Patented May 11, 1880.
Fig 1,
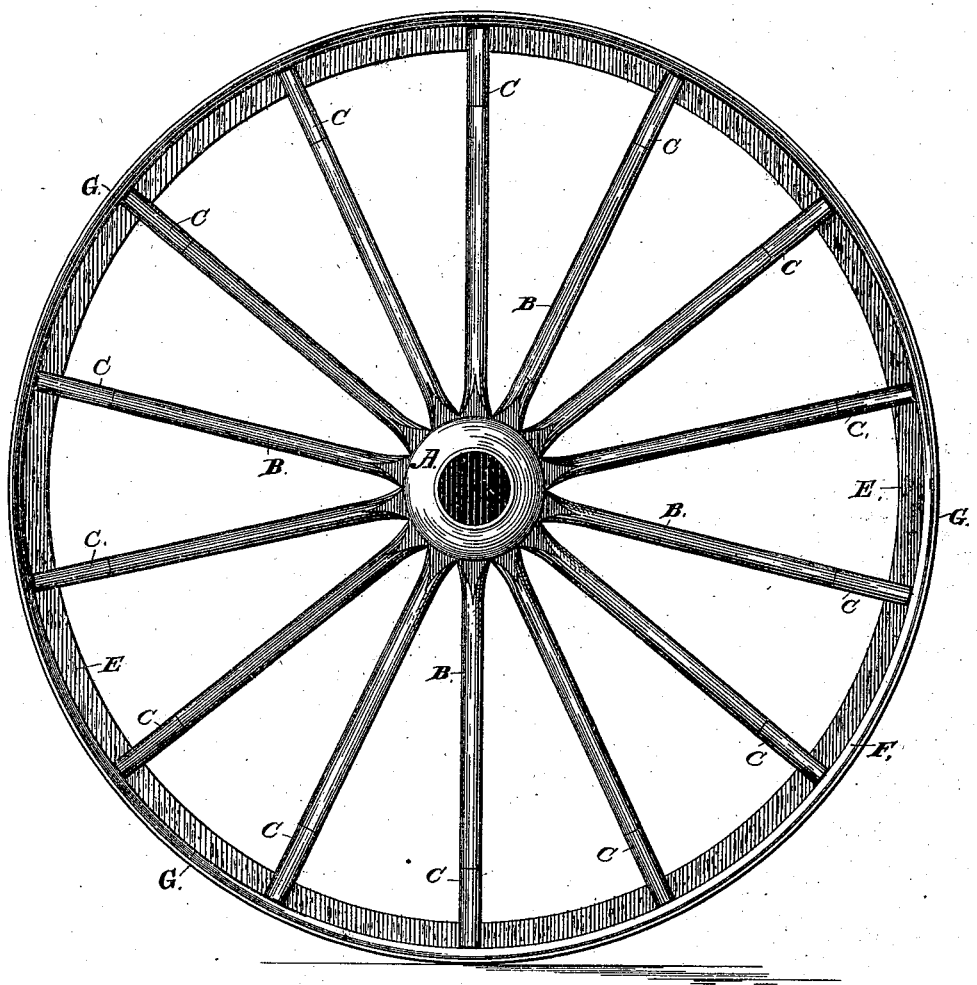
Fig 2,
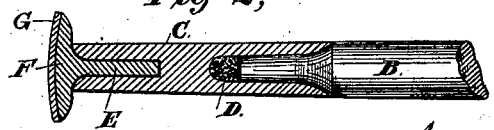
Attest:
Inventor:
James C. Turnbull
By Knight Bros Attys.

UNITED STATES PATENT OFFICE.

JAMES C. TURNBULL, OF GOUVERNEUR, NEW YORK.

VEHICLE-WHEEL.

SPECIFICATION forming part of Letters Patent No. 227,458, dated May 11, 1880.

Application filed November 18, 1879.

*To all whom it may concern:*

Be it known that I, JAMES COMMON TURNBULL, of Gouverneur, in the county of St. Lawrence and State of New York, have invented a new and useful Improvement in Vehicle-Wheels, of which the following is a specification.

My improved wheel is constructed of T-shaped metal fellies, crowning on the outside to prevent the lateral displacement of the tire, combined with bell-shaped spoke-sockets, which are notched to fit over the web of the felly and contain cushions to afford elastic bearings for the outer extremities of the spokes.

In order that my invention may be fully understood, I will proceed to describe it with reference to the accompanying drawings, in which—

Figure 1 is a face view of a wheel embodying my invention. Fig. 2 is a section, on a larger scale, of the outer portion of the wheel.

A represents a hub of common form. B B are spokes fitted in the hub in the usual manner and made somewhat shorter than the radius of the wheel, their length being supplemented by spoke-sockets C, which are made with bell-shaped or flaring mouths to receive the spoke ends and cause the latter to be wedged firmly in the said sockets.

Within the sockets are cushions D, of leather or other more or less elastic material, to afford bearings for the ends of the spokes within the sockets and keep the spokes from contact with the metal at their ends.

The spoke-sockets are slotted, as shown in Fig. 2, to embrace the web E of my improved T-shaped metallic felly, the flange F of which is formed in one piece with the web E, and made crowning on the outside to receive the tire G and prevent the lateral displacement thereof. The tire may be shrunk on in the usual manner.

Having thus described my invention, the following is what I claim as new and desire to secure by Letters Patent:

A vehicle-wheel having a metallic felly constructed with a radial web, E, and a crowning circumferential flange, F, a metallic tire, G, and slotted and bell-shaped metallic sockets C, for connecting the felly to the spokes, substantially as shown and described.

JAMES C. TURNBULL.

Witnesses:
ROGER D. JONES,
HUGH S. DICK.